United States Patent [19]

Lermann et al.

[11] 4,240,727
[45] Dec. 23, 1980

[54] FOCUSSING SYSTEM

[75] Inventors: Peter Lermann, Narring; Istvan Cocron, München; Günter Fauth, Unterhaching, all of Fed. Rep. of Germany

[73] Assignee: AGFA-Gevaert, A.G., Leverkusen, Fed. Rep. of Germany

[21] Appl. No.: 2,938

[22] Filed: Jan. 12, 1979

[30] Foreign Application Priority Data

Jan. 13, 1978 [DE] Fed. Rep. of Germany ....... 2801393

[51] Int. Cl.³ .................... G03B 3/10; G01C 3/08; H01J 40/14
[52] U.S. Cl. ........................ 354/25; 354/31; 352/140; 356/4; 250/201; 250/214 B
[58] Field of Search ........... 354/25, 31, 195, 23 D, 354/163, 165; 352/140; 250/204, 201, 214 B; 356/1, 4; 358/213

[56] References Cited

U.S. PATENT DOCUMENTS

| 3,443,502 | 5/1969 | Harvey | 354/25 |
| 3,617,128 | 11/1971 | Harvey | 356/4 |
| 3,945,023 | 3/1976 | Stauffer | 354/25 |
| 4,004,852 | 1/1977 | Pentecost | 354/25 X |

*Primary Examiner*—Richard A. Wintercorn
*Assistant Examiner*—William B. Perkey
*Attorney, Agent, or Firm*—Michael J. Striker

[57] ABSTRACT

A first photodetector arrangement comprises three adjoining photodetectors, and a second comprises six. First and second optics, and the two photodetector arrangements, are located immovable on the camera, and the optics project onto the first arrangement an image of a subject which is to form the basis of a subject-distance measurement, without shift between image and photodetectors of the first arrangement so long as the subject-distance is within one of the ranges the system is to furnish; whereas the image projected onto the second photodetector arrangement shifts relative thereto in dependence upon the distance to the subject. The six photodetectors of the second arrangement are subdivided, for signal-processing purposes, into four successive groups, respectively comprised of the first, second and third photodetector, the second, third and fourth, the third, fourth and fifth, etc. A plurality of comparisons are performed by signal-evaluating circuitry, on the basis of absolute-value versions of the differences between the output signals of individual photodetectors in the first arrangement and in successive photodetector-groups within the second arrangement, to automatically ascertain, sequentially or non-sequentially, which photodetector-group in the second photodetector arrangement is in receipt of an image best corresponding to that cast onto the first photodetector arrangement, thereby determining the subject-distance setting best corresponding to the true subject-distance value.

4 Claims, 8 Drawing Figures

FOCUSSING SYSTEM

BACKGROUND OF THE INVENTION

The present invention concerns focussing systems for photographic still and motion picture cameras, the focussing system being of the type comprising a first photodetector arrangement which includes a plurality of individual photodetectors, and also a second photodetector arrangement likewise comprising a plurality of individual photodetectors, and an evaluating circuit receiving the output signals from the photodetectors to generate signals indicative of the state of focus of the camera, e.g., for the control of the motor which automatically adjusts the distance-setting of the objective or to indicate to the user the direction in which he should manually adjust the distance-setting of the objective.

SUMMARY OF THE INVENTION

It is a general object of the invention to provide a focussing system of the type identified so designed that without the use of additional moving parts, and in a particularly simple way, focus-control information can be generated in accordance with a distance-measuring technique based upon the principle of triangulation.

In the preferred embodiment of the invention, use is made of a first optics cooperating with the first photodetector arrangement and a second optics cooperating with the second photodetector arrangement. Both photodetector arrangements and their associated optics are immovably mounted on the camera. The second photodetector arrangement comprises a number of individual photodetectors in excess of the number of photodetectors contained in the first photodetector arrangement, the number by which the photodetectors of the second photodetector arrangements exceeds that of the first being dependent upon the number of distinct subject-distance ranges which the focussing system is to afford. The photodetectors of the second photodetector arrangement are, for the purposes of signal evaluation, organized as a succession of photodetector groups. Successive photodetector groups overlap one another, and each such photodetector group consists of the same number of photodetectors. Each photodetector group is then associated with a respective one of the subject-distance ranges which are to be made available. For example, the second photodetector arrangement may comprise six photodetectors organized, for the purposes of signal evaluation, to constitute four successive photodetector groups, each photodetector group consisting of three immediately adjoining photodetectors. Thus the first, second and third photodetectors of such six would constitute the first photodetector group; the second, third and fourth the second photodetector group; the third, fourth and fifth the third photodetector group; and the fourth, fifth and sixth the fourth photodetector group. The optics associated with the first photodetector group is so designed and located that the subject forming the basis of the distance measurement is always projected onto the first photodetector arrangement irrespective of which of the available distance-setting ranges is involved, whereas the optics associated with the second photodetector arrangement is so designed and located that the subject forming the basis of the distance measurement is projected, in a sense comparable to its projection onto the first photodetector arrangement, onto a specific photodetector group within the second photodetector arrangement.

The output signals of the photodetectors of the first photodetector arrangement are then compared against the output signals of the corresponding photodetectors of successive individual ones of the photodetector groups in the second photodetector arrangement, either in accordance with a sequential schedule or else simultaneously. Thus, for example, assume that the first photodetector arrangement consists of three photodetectors, and the second photodetector arrangement of six photodetectors. First, the output signals from the first photodetector arrangement are compared against the output signals of the first photodetector group within the second photodetector arrangement, and difference signals are generated on a one-for-one basis, but with respect to absolute magnitude only, so as to yield three absolute-value difference signals. Next the output signals of the photodetectors of the first photodetector arrangement are compared against those from the second group of photodetectors within the second photodetector arrangement, and so forth.

The plural absolute-value difference signals resulting from each of these photodetector-group comparisons are then applied to an adding stage, and the output signal of the latter is transmitted to an analog or digital evaluating stage provided with comparators operative for ascertaining the minimum or maximum value in the differences between the signals from the first photodetector arrangement and those from the successive photodetector groups within the second photodetector arrangement. The evaluating stage generates focus-control data. The focus-control data is used to control an indicator arrangement which indicates to the user the direction in which he should manually adjust the camera's focus adjuster; or else the focus-control data is applied to one input of a comparator stage which is also in receipt of feedback data concerning the present distance-setting of the camera, with the comparator generating output signals for the control of a motor serving to automatically adjust the distance-setting of the objective. Or else the focus-control data is used to control the operation of an electromagnetic arresting device which arrests the focus adjuster mechanism of the camera as the latter, previous to initiation of an exposure, is moved through its successive subject-distance settings.

Advantageously, the subject forming the basis of the distance measurement, or a predetermined section of the image of such subject, is always and substantially identically projected onto the plural detectors of the first photodetector arrangement, whereas the subject is similarly projected onto different ones of the plural photodetector groups contained within the second photodetector arrangement in dependence upon the actual distance to this subject.

Thus, for example, a plurality of adjoining photodetectors located in the middle of the greater number of photodetectors in the second photodetector arrangement constitute a photodetector group associated with a middle subject distance range, whereas the groups of adjoining photodetectors located to the left or the right thereof, and furthermore overlapping such group of photodetectors, are associated with lower or higher subject-distance ranges.

Preferably, and very advantageously, all photodetectors within each photodetector arrangement are located in a single common plane.

In accordance with the sequential or simultaneous subtraction schedule followed, the output signals of each successive photodetector group within the second photodetector arrangement are compared against the corresponding output signals of the photodetectors of the first photodetector arrangement individually, i.e. on a photodetector-by-photodetector basis, for example by means of simple subtraction. Then, the groupwise generated absolute-value difference signals are summed. By means of analog-or-digital evaluating circuitry comprising comparators, the system then ascertains, preferably, the minimum difference between the signals generated by the photodetectors of the first photodetector arrangement, on the one hand, and, on the other hand those generated by the photodetectors of the successive photodetector groups within the second photodetector arrangement. If the subject forming the basis of the distance measurement is located at a distance corresponding to one of the available subject-distance ranges, the evaluating circuitry associated with such range exhibits a minimum value for the difference between the signals produced by the photodetector group associated with such range and those produced by the first photodetector arrangement. All the other evaluating stages, associated with the other available subject-distance ranges, will exhibit differences, relative to the output signals of the first photodetector arrangement, greater than those exhibited by the output signals of the photodetector group associated with the true subject-distance range. Information indicative of which subject-distance range is in truth involved is generated and serves to inform the user of the subject-distance range to which he should manually set the objective of the camera. Alternatively this focus-control information is used as the command-value signal for a comparator, the comparator also being in receipt of actual-value information indicating the present distance-setting of the camera objective. Such comparator can then be used, for example, to activate an indicator which directly informs the user of the direction in which the focus-adjusting member of the camera should be manually moved, or else to energize an electric motor which will move the camera objective in the requisite direction. Thus, for example, a positive-polarity error in the state of focus of the camera can be displayed by an illuminated arrow, visible in the camera viewfinder and pointing clockwise, with a negative-polarity state of focus error being similarly displayed but by means of an illuminated arrow pointing counterclockwise. The user need only turn the focus adjuster ring of the camera in the direction in which the illuminated one of the two arrows points, and in particular until such time as the illuminated one of the two arrows goes dark to indicate that the correct subject-distance range has now been reached by the objective.

In accordance with a preferred concept of the invention the number of photodetectors within each photodetector group of the second photodetector arrangement always equals the number of photodetectors in the first photodetector arrangement.

In the preferred embodiments of the invention, a plurality of operational amplifiers, one per photodetector, are provided intermediate the subtracting means employed and the individual respective photodetectors of the first and second photodetector arrangements. The first inputs of all these operational amplifiers are then connected in common to the output of a stage which is operative for producing a signal indicating the average of all the output signals produced by the photodetectors of the second photodetector arrangement. By means of this expedient, operation of the subtracting means employed at operating points near the saturation of such subtracting means is avoided, because all signals are expressed with reference to the average of all the photodetector output signals of the second photodetector arrangement. This serves to render the magnitudes or amplitudes of the signals being processed substantially constant and independent of the prevailing scene-light level, i.e. in comparison with the case wherein the technique of referencing to such average value is not employed.

In accordance with one advantageous concept of the invention, the comparisons between the output signals of the photodetectors of the first photodetector arrangement, on the one hand, and, on the other hand those of the successive photodetector groups within the second photodetector arrangement, are performed not simultaneously but instead sequentially using a multiplexer. The multiplexer sequentially routes to a difference generating stage the output signals from the photodetectors of each successive photodetector group within the second photodetector arrangement. The multiplexer stage comprises a number of outputs equal to the number of photodetectors per photodetector group. The multiplexer is advanced by means of a clock generator having plural outputs upon which signals successively appear as the successive photodetector groups are interrogated. These clock generator outputs are additionally fed into corresponding inputs of a clocked storage stage, for example a one-stage shift register. The shift input of the clock storage stage is connected to a digital evaluating stage, which latter shifts the register, or causes it to latch or register the input signals applied to it, when the smallest of the groupwise generated pluralities of difference signals has been ascertained. The clocked storage then produces at one of its outputs a signal, which of the outputs this is being indicative of which available subject-distance range is truly required. Furthermore when this minimum difference has been ascertained the group of difference signals associated therewith are registered, and made available for other signal-processing purposes such as contrast-level measurement.

The clocked storage stages can, for example, be masterslave flip-flops.

According to a further concept, the evaluating stage comprises an analog-to-digital converter and a comparator, the signals from the converter being furthermore applied to the inputs of a clocked storage stage, for example a one-stage shift register, the outputs of such storage stage feeding into the other inputs of the comparator. In this way, as the successive groupwise comparisons are made the resultant succession of difference signals replace each other, at the second inputs of such comparator, in an ongoing search for the minimum set of difference signals among the plurality of such signal sets.

For the purposes of start-up, the aforementioned second inputs of the comparator, at the start of operation, are fed a signal of maximum value, which is thereafter replaced by the first arising set of difference signals, such set being with certainty smaller than such maximum value. To furnish this start-up maximum value to the second inputs of the comparator, those inputs are preferably connected to the outputs of a set of OR-gates, the first inputs of all the OR-gates in such set being connected in common to the output of a timing stage operative only at the start of operation for furnishing such maximum value to the second comparator input.

According to a further concept of the invention use is made of a contrast comparator having a first set of inputs in receipt of a signal identifying the lowest acceptable level of contrast for the image forming the basis of the distance measurement, and having another set of inputs receiving the aforementioned minimum one of the difference signals. The comparator controls the indicator which informs the user, for example by the lighting up of a light-emitting diode, that the contrast presently exhibited by the image forming the basis of the distance measurement is insufficient for the purposes of the focussing system. Advantageously, such indicating element, e.g. a light-emitting diode, can be driven by a low frequency pulse generator, so as to present the user with a flashing indication when the contrast is insufficient for the purposes of the system, with for example a persistent ilumination of the light-emitting diode serving to indicate sufficient contrast.

According to a further concept of the invention, the signal furnished to such contrast comparator, and serving to indicate the lowest acceptable level of image contrast, is, in terms of signal-processing, exceeded in the case of sufficient contrast and not exceeded in the case of insufficient contrast.

According to a further concept of the invention, the aforementioned clock generator comprises a pulse generator and a counter, the latter preferably a Johnson or 1-out-of-n counter. The count reached by such counter upon completion of the last such comparison results in resetting of the counter. Advantageously the shift register mentioned above is followed by another shift register, whose shift or clock input is connected, through intermediary of a time-delay stage, to the last output of such counter.

Instead of performing the aforementioned groupwise comparisons or subtractions on a sequential basis, these can be formed on a simultaneous basis using a number of adders equal to the number of available subject-distance settings. Each adder, then, serves to perform a distinct one of the aforementioned groupwise comparisons.

In the latter event, the outputs of the adders can be connected to the inputs of a set of subtractors and logic gates terminating in a number of output terminals equal to the number of subject-distance settings available, with an output signal appearing on just one of these outputs, in correspondence to that one of the plural and groupwise comparisons yielding the minimum difference value. The subtractors employed are advantageously of the operational-amplifier type.

If three subject-distance settings are to be provided, then the first such operational amplifier is advantageously connected to the outputs of the first and second adders, the second such operational amplifier to the outputs of the second and third adders, and the third such operational amplifier to the outputs of the third and first adders, with a first AND-gate being connected to the first and via an inverter to the third operational amplifier, a second AND-gate being connected to the second and via an inverter to the first operational amplifier, and an OR-gate being connected to the second and via an inverter to the third operational amplifier. The provision of these logic stages serves in a simple way to assure that, at the output of the first AND-gate, there always be present the minimum of the first groupwise generated differences, relative to the other two groupwise generated differences. At the output of the second AND-gate, there will be signalled the minimum groupwise difference relative to the other two groupwise generated differences. The same result is achieved for the output signal of the aforementioned third, OR-gate.

According to another concept of the invention, there is provided a plurality of focus-control electromagnets, equal in number to the number of available subject-distance settings. These magnets are connected to the outputs of the evaluating circuit, with the armatures of these individual electromagnets, or elements moved by such armatures, being movable into and out of the path of movement of the focus adjuster member of the camera. The armatures can for example be designed as levers movable into and out of the path of the movement of a projection on a focus adjuster ring coupled to the objective of the camera. Such focus adjuster ring can then be spring driven upon depression of a trigger button, with the focus adjuster ring coming to a stop when it reaches the system-selected distance-setting, by virtue of such projection on it being arrested by one of such armatures.

According to another concept of the invention only a single such focus-control electromagnet is employed. A plurality of switches, equal to the number of available subject-distance settings, or one less than such number, are activated one after the other as the focus adjuster ring, or other such focus adjuster member, moves successively through its settings; depending upon the output signal of the evaluating circuit the focus-control electromagnet is deenergized (or energized), at such an instant as to arrest the focus adjuster member when it reaches the correct distance setting. The use of only a single focus-control electromagnet inherently makes for reduced current consumption. The aforementioned plurality of switches can be provided in the form of a succession of contact strips provided on the focus adjuster ring itself with each such strip being associated with a respective subject-distance setting. Upon depression of a trigger button the focus adjuster member is moved through its successive settings by a spring-driven mechanism. Preferably, the focus adjuster member is returned to its starting position each time the shutter of the camera is reset or recocked, causing the camera objective to be adjusted, each such time, to one of its extreme settings, i.e. either minimum or maximum distance setting. Alternatively, however, a succession of limit switches could be located stationary, one after the other, in the path of movement of the focus adjuster member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
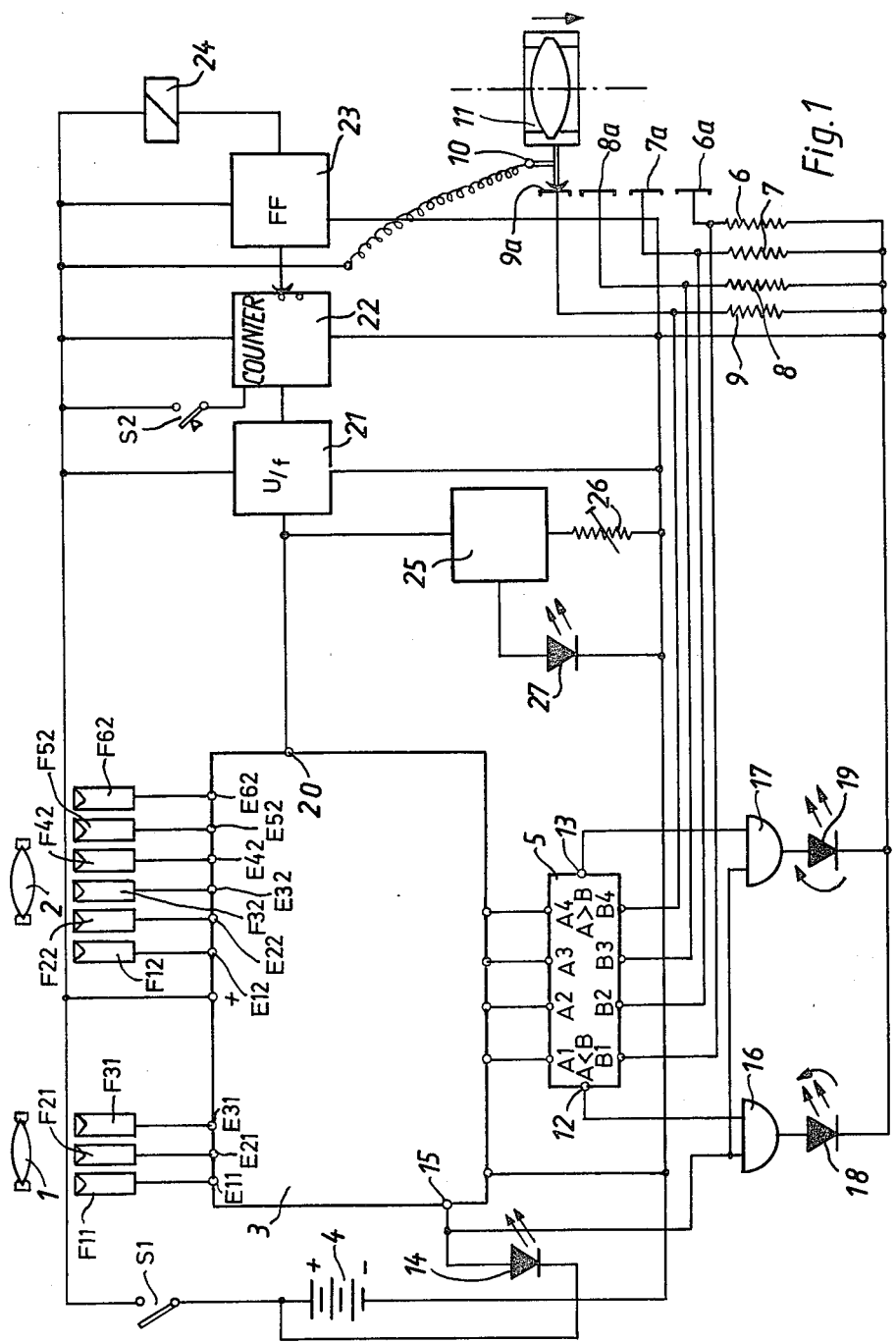
FIGS. 1, 2 and 2a depict a first embodiment of the invention.

In FIG. 1, F11, F21, F31 denote the photodetectors of a first photodetector arrangement, in front of which an optics 1 is arranged. Optics 1 and this first photodetector arrangement are so located that, irrespective of the true distance to the subject, and provided only that such true distance corresponds to one of the available subject-distance settings, the subject or at least a predetermined sector of the subject image is always cast onto the photodetectors F11 to F31 of this first photodetector arrangement. A second photodetector arrangement comprises six photodetectors F12, F22, F32, F42, F52, F62. Arranged in front of the second photodetector arrangement is an optics 2. Unlike optics 1, optics 2 is so designed and located that the subject image, or the predetermined sector thereof, does not always fall identically on the photodetectors of the second photodetector arrangement. Instead depending upon the true distance to the subject, the subject image, or predetermined sector thereof, falls upon three adjoining ones of these six photodetectors, the three upon which it falls accordingly constituting a photodetector group within the second photodetector arrangement. For example, assume that distance to the subject corresponds to the shortest available subject distance setting. The subject image is cast onto the photodetectors F12, F22, F32, these accordingly constituting the first three-detector photodetector group within the second photodetector arrangement, and being associated with the shortest range of the subject-distances to which the objective can be set. The second such three-detector group in the second photodetector arrangement consists of the three photodetectors F22, F32, F42. If the true distance to the subject corresponds to the second available subject-distance range, then the subject image, or predetermined sector thereof, falls upon these three photodetectors F22, F32, F42. If the true distance of the subject corresponds to the longest available range, the subject of interest is cast onto the photodetector group comprised of detectors F42, F52, F62. Accordingly, the six photodetectors F12 to F62 serve to establish four adjoining photodetector groups each comprised of three photodetectors, with adjoining photodetector groups overlapping.

Optics 1 and optics 2 and all the photodetectors are immovably mounted on the camera housing. The subject distance measurement here performed is based upon the principle of triangulation. The optical axis of the first optics is coincident with the direction in which the camera is aimed when planning a shot. Accordingly, the subject is always projected onto the first photodetector arrangement. The second optics is located displaced relative to the first optics, by an amount corresponding to the base length of the triangulation employed. The focal lengths of the first and second optics are selected such that, so long as the distance to the subject falls within any of the available subject distance ranges, the image of the subject, or sector thereof, cast onto the first and second photodetector arrangements will always be at least fairly sharp. The individual photodetectors are connected to an evaluating circuit 3 which can be connected to the positive terminal of a battery 4 by means of a switch S1. Evaluating circuit 3 has four outputs A1, A2, A3, A4 and, depending upon the focus situation, a signal appears on a single one of these four outputs. In particular the output upon which such signal appears indicates which one of the four available subject-distance ranges corresponds to the true distance from the camera to the subject. These outputs A1 to A4 feed into corresponding inputs A1 to A4 of a comparator 5 whose other four inputs B1, B2, B3, B4 are connected to resistors 6, 7, 8, 9. These resistors 6 to 9 are alternatively connectable, via contact strips 6a, 7a, 8a, 9a, to a sliding contact 10, which is electrically connected to the positive terminal of battery 4 and mechanically mounted on the carrier for objective 11. Sliding contact 10 engages one or another of these four contact strips 6a, 7a, 8a, 9a, depending upon which one of the four available subject-distance ranges the camera objective 11 has been set for.

The first output 12 of comparator 5 produces an output "1" signal, when the quantity represented by the signal combination applied to inputs A1 to A4 is smaller than the number represented by the signal combination applied to inputs B1 to B4. Comparator 5 has a second output 13, at which is produced a "1" signal, when the number represented by the signal combination applied to inputs A1 to A4 is greater than that represented by the signal combination applied to inputs B1 to B4.

A light-emitting diode 14 has its anode connected to an output terminal 15 of the evaluating circuit 3, and serves to indicate when the contrast of the subject image to be focussed is insufficient. I.e., if the image contrast is insufficient, for example to such an extent as to preclude automatic focussing based on the triangulation technique of the present invention, then LED 14 lights up, whereas it does not light up if the contrast is sufficient.

Output 12 of comparator 5 feeds to one input of an AND-gate 16, and output 13 to a corresponding input of an AND-gate 17. The other inputs of the two AND-gates 16, 17 are both connected to the output 15 of the evaluating circuit 3. In the output circuit of AND-gate 16, there is connected a light-emitting diode 18, and in that of AND-gate 17 a light-emitting diode 19. LED 18 lights up when the user should turn the focus adjuster ring for the objective in the counterclockwise direction in order to correct the camera's state of focus. LED 19 lights up when the focus adjuster ring should be turned in the clockwise direction to correct the camera's state of focus.

Evaluating circuit 3 has an output terminal 20 which is connected to the input of a voltage-to-frequency converter 21, to the output of which is connected the input of a counter 22. Counter 22 is a backward counter and, at the start of a counting operation if first preset to a predetermined number. Connected to the output of counter 22 is a flip-flop 23 in whose output circuit is connected a shutter-control magnet 24. Counter 22 commences to count upon activation of a start switch S2. Switch S2 closes when the camera's shutter is triggered, for example as the user depresses the shutter to the button of the camera.

Output 20 of evaluating circuit 13 is furthermore connected to the input of a comparator stage 25, whose threshold level is preset to a certain value by means of an adjustable resistor 26. A light-emitting diode 27 connected to the output of comparator stage 25 indicates to the user whether the prevailing scene light level is or is not sufficient for the making of an acceptable exposure.

Figure 2:
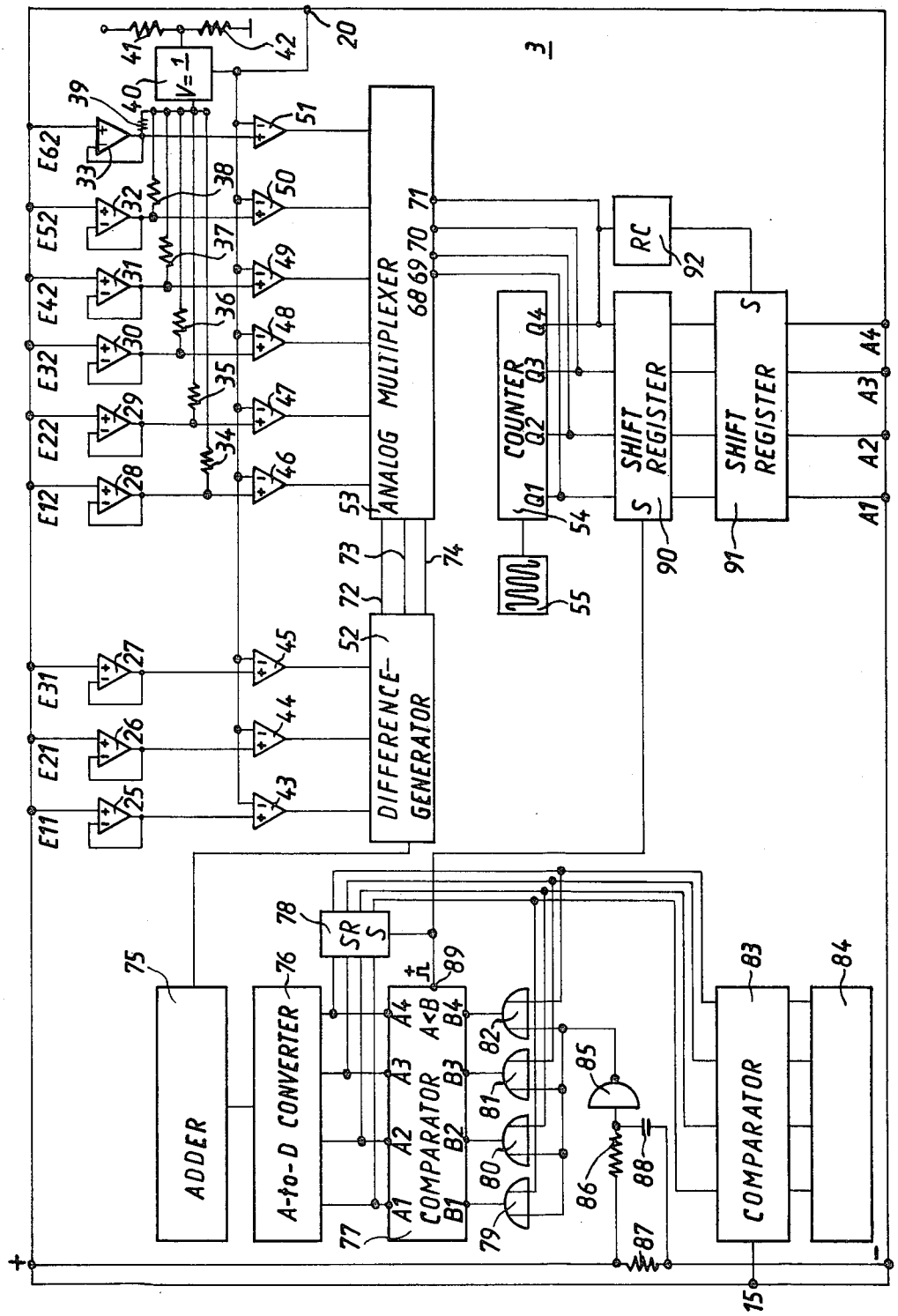

FIG. 2 is a detailed circuit diagram of the evaluating circuit 3 of FIG. 1. Its three inputs E11, E21, E31 are each connected to the input of a respective one of three operational amplifiers 25, 26, 27. Likewise, the inputs E12 to E62 of evaluating circuit 3 are each connected to the input of a respective one of six operational amplifiers 28, 29, 30, 31, 32, 33. The operational amplifiers 25 to 33 serve as impedence converters. The output signals of operational amplifiers 28 to 33 are transmitted by respective resistors 34, 35, 36, 37, 38, 39 to the input of an amplifier stage 40, whose gain is set by means of a voltage divider 41, 42, to a value equal to the reciprocal of the number of photodetectors F12 to F62 contained in the second photodetector arrangement. The output signal of amplifier stage 40 is equal to one-sixth the sum of the output signals from the six operational amplifiers 28 to 33, and therefore corresponds to the average of those six output signals. The output signal from amplifier stage 40 is available at external terminal 20 of evaluating circuit 3, as shown. The output of amplifier stage 40 is furthermore connected to the inverting inputs of three operational amplifiers 43, 44, 45, whose non-inverting inputs are connected to the outputs of respective ones of the three operational amplifiers 25, 26, 27. Likewise the output of amplifier stage 40 is connected to the inverting inputs of six operational amplifiers 46, 47, 48, 49, 50, 51, whose non-inverting inputs are connected to the outputs of respective ones of operational amplifiers 28 to 33. Accordingly, the output signals of the operational amplifiers 43 to 45 associated with the first photodetector arrangement are, unlike the output signals of operational amplifiers 25 to 27, referenced to the average value of the output signals from the six photodetectors F12 to F62 of the second photodetector arrangement. Likewise, the output signals of the six operational amplifiers 46 to 51 associated with the second photodetector arrangement are, unlike the output signals of operational amplifiers 28 to 33, referenced to the average value of the output signals furnished by the six photodetectors of the second photodetector arrangement. This affords the advantage that the signals which are now to be processed are substantially independent of the prevailing scene-light level.

The outputs of the operational amplifiers 43 to 45 are connected to a corresponding three inputs of a difference generator stage 52, whose other three inputs are connected to the three outputs of an analog multiplexer 53. The six inputs of analog multiplexer 53 are connected to the outputs of respective ones of operational amplifiers 46 to 51. Analog multiplexer 53 is step-by-step advanced by a counter 54 which is of the so-called Johnson-type, or 1-out-of-n type. In particular the four outputs Q1, Q2, Q3, Q4 of Johnson counter 54 are connected to respective control inputs 68, 69, 70, 71 of multiplexer 53. Counter 54, in turn, is step-by-step advanced by clock pulses furnished by a pulse generator 55.

Difference generator stage 52 performs three subtractions at a time. In the first subtraction the output signals from operational amplifiers 43, 44, 45 are subtracted from those of operational amplifiers 46, 47, 48, yielding three difference signals which appear in parallel at the three outputs of stage 52; for the sake of simplicity these three outputs of stage 52 are shown as a single line. These three difference values are generated as absolute magnitudes, i.e. irrespective of the sign of the three differences represented. The second three subtractions performed by difference generator stage 52 involve the subtraction of the output signals from operational amplifiers 43, 44, 45 from the output signals of the second group of operational amplifiers 47, 48, 49; and so forth.

Figure 2A:
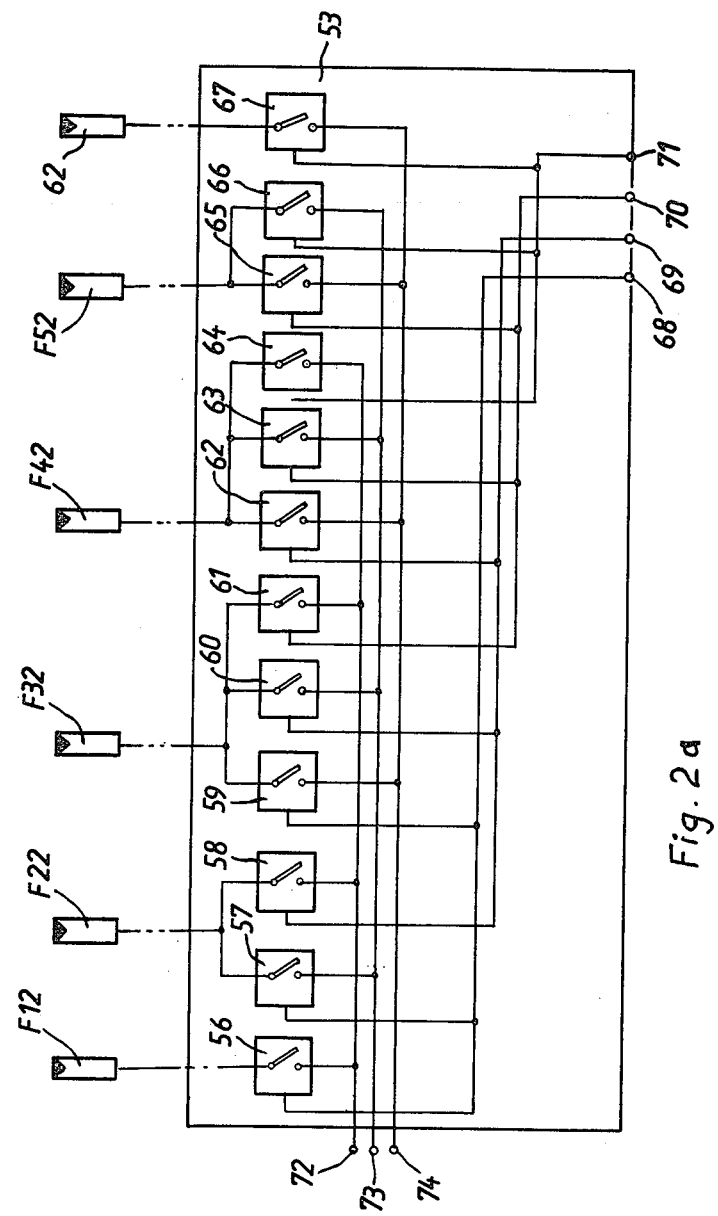

The analog multiplexer 53 of FIG. 2 is shown in detail in FIG. 2a. It comprises electronic switches 56, 57, 58, 59, 60, 61, 62, 63, 64, 65, 66 and 67. The input terminals connected to the Johnson counter 54, namely terminals 68, 69, 70, 71, are expressly shown in FIG. 2a.

The outputs of the electronic switches 56, 58, 61, 64 are connected in common to a first line 72 leading to the difference generator stage 52; the outputs of the electronic switches 57, 60, 63, 66 are connected in common to a line 73 leading to the second input of difference generator stage 52; and the outputs of the electronic switches 59, 62, 65, 67 are connected in common to a line 74 leading to the third input of the difference generator stage 52. Through the intermediary of the various operational amplifiers already discussed, the output of photodetector F12 is connected to the input of electronic switch 56, the output of photodetector F22 to the inputs of electronic switches 57 and 58, the output of photodetector F32 to the inputs of electronic switches 59, 60, 61, the output of photodetector F42 to the inputs of electronic switches 62, 63, 64, the output of photodetector F52 to the inputs of electronic switches 65 and 66, and the output of photodetector F62 to the input of electronic switch 67.

If a "1" signal is applied to input 68 of analog multiplexer 63, i.e. from output Q1 of Johnson counter 54, then electronic switches 56, 57, 59 are rendered conductive, and the signals from photodetectors F12, F22, F32, through the intemediary of the operational amplifiers already discussed, are transmitted via lines 72, 73, 74 to the three inputs of difference genrator stage 52. I.e., the inputs 72, 73, 74 of difference generator stage 52 are now in receipt of the signals from first three-detector group within the second photodetector arrangement. If a "1" signal is applied to multiplexer input 69, then switches 58, 60, 62 become conductive, and the signals from the outputs of the second group of photodetectors F22, F32, F42 are transmitted via lines 72 to 74 to the difference generator stage 52. If a "1" signal is applied to input 70 of multiplexer 53, then switches 61, 63, 65 are rendered conductive, and the signals from the third-group photodetectors F32, F42, F52 are transmitted by lines 72 to 74 to the difference generator stage 52. If a "1" signal is applied to multiplexer input 71 then switches 64, 66, 67 become conductive, so that the signals from the fourth-group photodetectors F42, F52, F62 are transmitted via lines 72 to 74 to the difference generator stage.

Thus, returning to FIG. 2, for each of the four successive subtractions just referred to, difference generator stage 52, at its three outputs symbolized by a single line, furnishes the three difference signals involved, in absolute-value form without respect to polarity, the three inputs of an adder stage 75. Adder 75 produces the analog output signal corresponding to the sum of the three absolute-magnitude difference values in question. The output of adder 75 is connected to the input of an analog-to-digital converter 76. Converter 76 converts this analog sum signal into a 4-bit number presented on its four outputs, and this 4-bit number is transmitted to the four inputs A1, A2, A3, A4 of a comparator 77. The four outputs of analog-to-digital converter 76 are furthermore connected to the four inputs of a one-stage shift register or latch-type circuit 78, the four outputs of which are connected to the right inputs of respective ones of four OR-gates 79, 80, 81, 82. The four outputs of one-stage shift register 78 are furthermore connected to a first four inputs of a contrast comparator 83. The second four inputs of contrast comparator 83 receive a 4-bit number from the outputs of a stage 84 furnishing a signal indicative of minimum required contrast.

The left inputs of the four OR-gates 79 to 82 are connected in common to the output of an inverter stage 85, whose input is connected to the output of an RC stage comprised of two resistors 86, 87 and a capacitor 88. The outputs of the OR-gates 79 to 82 feed into respective ones of the inputs B1, B2, B3, B4 of the comparator 77. Output 89 of comparator 77 produces a "1" pulse if and only if the number represented by the 4-bit signal combination at comparator inputs A1 to A4 is smaller than that represented by the signal combination at inputs B1 to B4.

The output 89 of comparator 77 is connected, first, to the shift or latch input S of the shift register 78 and, second, to the shift input S of a further one-stage shift register 90.

The outputs Q1, Q2, Q3, Q4 of the Johnson (1-out-of-n) counter 54 feed into respective ones of four inputs of a further one-stage shift register 90, whose corresponding outputs feed into the four inputs of a still further one-stage shift register or latch-type circuit 91. The four outputs of shift register 91 are directly connected to the external terminals A1, A2, A3, A4 of signal evaluating circuit 3. The shift pulse input S of shift register 91 is connected through the intermediary of an RC timing stage 92, to the output Q4 of Johnson counter 54.

The operation of the evaluating circuit 3 shown in FIG. 2 will now be described:

At the start of the counting cycle of the Johnson counter 54, a "1" signal is applied to input 68 of analog multiplexer 53. As a result, there are transmitted to the three output lines 72, 73, 74 of multiplexer 53 three signals, each corresponding to the difference between a respective one of the three output signals of operational amplifiers 46, 47, 48, on the one hand, and, on the other hand, a signal corresponding to the average of the output signals of all six photodetectors F12 to F62 of the second photodetector arrangement, this average-value signal being furnished from the output of summing amplifier stage 40. These three signals on lines 72, 73, 74, are transmitted to the first inputs of difference generator stage 52. The other three inputs of the difference generator stage 54 receive the output signals from the three operational amplifiers 43, 44, 45. Difference generator stage 52 produces at its three outputs three corresponding absolute-value difference signals, which are transmitted to the three inputs of adder stage 75, algebraically summed therein, and from the output of stage 75 transmitted to the input of analog-to-digital converter 76. The 4-bit number produced by converter 76 is applied to inputs A1, A2, A3, A4 of comparator 77. For the purposes of this first step of operation, a "1" signal is applied via RC-stage 86, 87, 88 and the inverter 85 to the left inputs of all four OR-gates 79, 80, 81, 82, and thereby to the second four inputs B1, B2, B3, B4 of comparator 77. As a result all four of the comparator inputs B1, B2, B3, B4 are in receipt of "1" signals. This assures, for this first step of operation, that the number applied to the B inputs of comparator 77 will exceed the number applied to the A inputs thereof. Consequently, output 89 of comparator 77 produces a "1" pulse, which is applied to the shift input S of shift register or latch-type stage 78, causing the four bit applied to the input of the latter to be registered at the four outputs thereof. This application of "1" signals to all B inputs of comparator 77 occurs only for the first step of operation; soon thereafter, the signal at the output of timing stage 86, 87, 88, changes from "0" to "1", and therefore via inverter 85 the aforementioned "1" signals applied to the left inputs of OR-gates 79, 80, 81, 82 disappear. Now, the four bits at the outputs of stage 78 are transmitted, via the right inputs of OR-gates 79 to 82 to the B inputs of comparator 77. The "1" pulse produced at the output 89 of comparator 77 is, also, transmitted to the shift input S of the one-stage shift register 90. As a result, the "1" signal present at output Q1 of Johnson counter 54 is registered by the corresponding one of the four outputs of stage 90.

This is the end of the first step of operation.

Next, the "1" signal at output Q1 of counter 54 shifts over to output Q2 thereof, and therefore shifts from input 68 to input 69 of analog multiplexer 53. As a result (see FIG. 2a), the output signals from photodetectors F22, F32, F42 are transmitted via lines 72, 73, 74 to difference generator stage 52, and therein subtracted from the signals from photodetectors F11, F21, F31. The absolute-value versions of these three differences are transmitted from the output of stage 52 to the output of adder stage 75, summed therein, and then applied to the input of analog-to-digital converter 76. The 4-bit signal combination produced at the outputs of converter 76 is applied to the four inputs A1, A2, A3, A4 of comparator 77, whereas the inputs B1, B2, B3, B4 thereof continue to be in receipt of the previous 4-bit signal combination. Assume, for the purposes of explanation, that the number applied to the A inputs of comparator 77 is, once again, lower than the number applied to the B inputs thereof. As a result a "1" pulse again appears at output 89 of comparator 77, causing the four outputs of register 78 now to register this second 4-bit signal combination, which is furthermore transmitted via the right inputs of OR-gates 79 to 82 to the B inputs of comparator 77, replacing the 4-bit signal combination previously applied thereto. This second "1" pulse produced at comparator output 89 is, furthermore, transmitted to the shift input S of one-stage shifter register 90, as a result of which the "1" signal presently applied to the second input thereof is registered at the second output thereof.

This concludes the second step of operation.

Next, the "1" signal at output Q2 of counter 54 shifts over to output Q3 thereof. The output signals from photodetectors F32, F42, F52 are now transmitted to difference generator stage 52. The three absolute-value difference signals produced at the three outputs of stage 52 are transmitted to the inputs of adder 75, summed therein, and applied to the input of converter 76. The corresponding 4-bit signal combination produced at the four outputs of converter 76 is now applied to the A inputs of comparator 77, and compared against the number 4-bit signal combination presently applied to the B inputs thereof. Let it now be assumed, for the purposes of explanation, that the number applied to the A inputs of comparator 77 is greater than the number applied to the B inputs thereof, as a result of which no "1" pulse is produced at comparator output 89. Accordingly, shift register 78 does not register the 4-bit signal combination applied to the inputs thereof, but instead continues to register the 4-bit signal combination previously applied to it. Likewise, therefore, the signal combination applied to the B inputs of comparator 77 is now not supplanted by the new signal combination but instead continues to be held. Furthermore, no "1" pulse is applied to input S of shift register 90, as a result of which stage 90 does not respond to the "1" signal at output Q3 of counter 54, and instead the "1" signal presently registered at the second output of stage 90 continues to be held.

Next, a "1" signal is applied to input 71 of analog multiplexer 53. As a result, the three output signals from photodetectors F42, F52, F62 are now transmitted to the inputs of difference generator stage 52. The three absolute-value versions of the resulting three difference signals are transmitted to adder stage 75, added therein, and converted by converter 76 into digital form, appearing at the four outputs thereof as a 4-bit signal combination now applied to the A inputs of comparator 77. If, now, the digital quantity applied to the A inputs of comparator 77 once more exceeds the digital quantity applied to the B inputs thereof then once again no "1" pulse appears at comparator output 89 and the outputs of stage 78 and of stage 90, as well as the B inputs of comparator 77, continue to register the signals previously registered. I.e., a "1" signal continues to be registered at the second output of shift register 90.

Now, the "1" signal which has appeared at output Q4 of counter 54, after a time delay interval introduced by RC stage 92, is applied to the shift input S of one-stage shift register or latch-type circuit 91. As a result, the "1" signal presently registered at the second output of stage 90 is now registered at the second output of stage 91, and therefore registered and held at external output A2 of evaluating circuit 3.

The "1" potential at output A2 of evaluating circuit 3 indicates that it is the output signals from the second photodetector group F22, F32, F42 of the second photodetector arrangement F12 to F62 which come the closest to the output signals of the three photodetectors F11, F21, F31 of the first photodetector arrangement. In other words, in this embodiment, the three output signals of the three photodetectors of the first photodetector arrangement are subtracted, in succession, from the three output signals of the first three photodetectors of the six-photodetector second photodetector arrangement, then from the second three photodetectors of the second photodetector arrangement, then from the third three photodetectors of the second photodetector arrangement, and finally from the fourth three photodetectors of the second photodetector arrangement, the smallest of the resulting four subtractions being automatically searched out to ascertain which of the four three-detector groups in the second photodetector arrangement best corresponds to the image received by the three photodetectors F11, F21, F31 of the first photodetector arrangement. Furthermore, the smallest of these four successively formed differences is registered and held.

This smallest of the four successively formed differences is now available at the outputs of register 78 and therefore present at the first four inputs of contrast comparator 83. Contrast comparator 83 now ascertains whether this first signal combination represents a number lower or higher than the second signal combination furnished to it from reference signal generator 84. If the first signal combination is lower than that from reference signal generator 84, the potential at output 15 of comparator 83 is at level "1", as a result of which light-emitting diode 14 lights up, to indicate to the user that the contrast exhibited by the image is insufficient. Furthermore, the left inputs of AND-gates 16, 17 are in receipt of "0" signals, so that neither of LED's 18, 19 can light up. Reference signal generator 84 furnishes a signal representing the lowest acceptable level of image contrast.

Let it be assumed that camera objective 11 is in the shortest available subject-distance range of settings. Accordingly, light-emitting diode 18, located visible in the viewfinder of the camera, lights up, indicating to the user the direction in which he should manually turn the focus adjuster ring to improve the state of focus, namely in the direction towards longer subject-distance settings. If now the adjuster ring is turned so far that the objective-coupled sliding contact 10 comes into engagement with contact strip 7a, then input B2 of comparator 5 receives a "1" signal, as a result of which the input signals at the A inputs of comparator 5 and at the B inputs thereof are identical, so that neither of the two light-emitting diodes 18, 19 lights up, i.e. LED 18 goes dark.

If the image being analyzed by the system does not exhibit sufficient immage contrast to permit the generation of focussing instructions for the user, then as already mentioned LED 14 lights up, continuously or intermittently, to indicate to the user that the system will not provide him with focussing instructions. Simultaneously, the AND-gates 16 and 17 are disabled so that neither of the two light-emitting diodes 18 and 19 can light up. The failure of LED's 18, 19 to light up, in this sense, serves as an auxiliary indication of the fact that the image contrast is insufficient.

Figure 3:
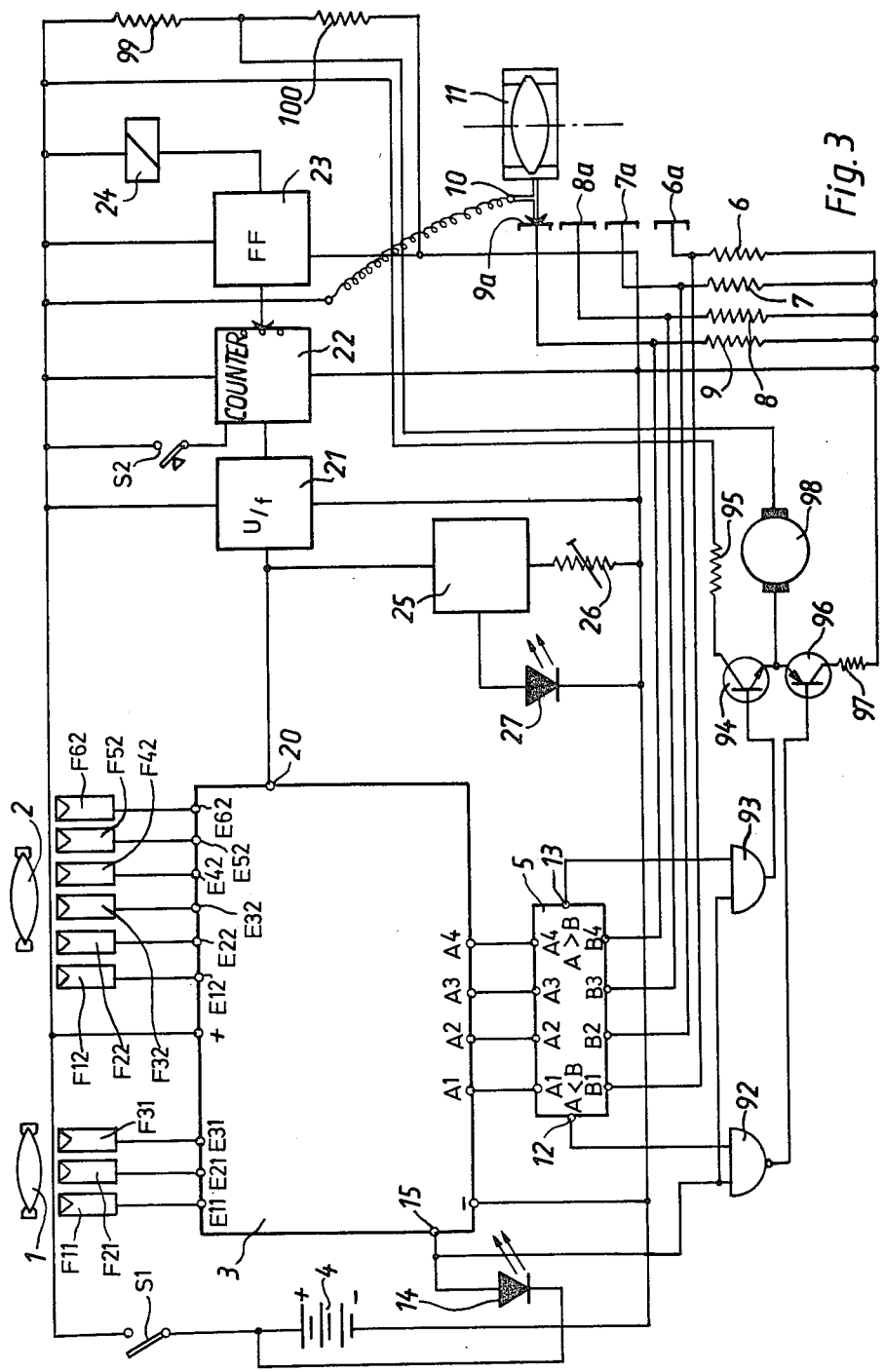
FIG. 3 depicts a second embodiment of the invention.
Figure 4:
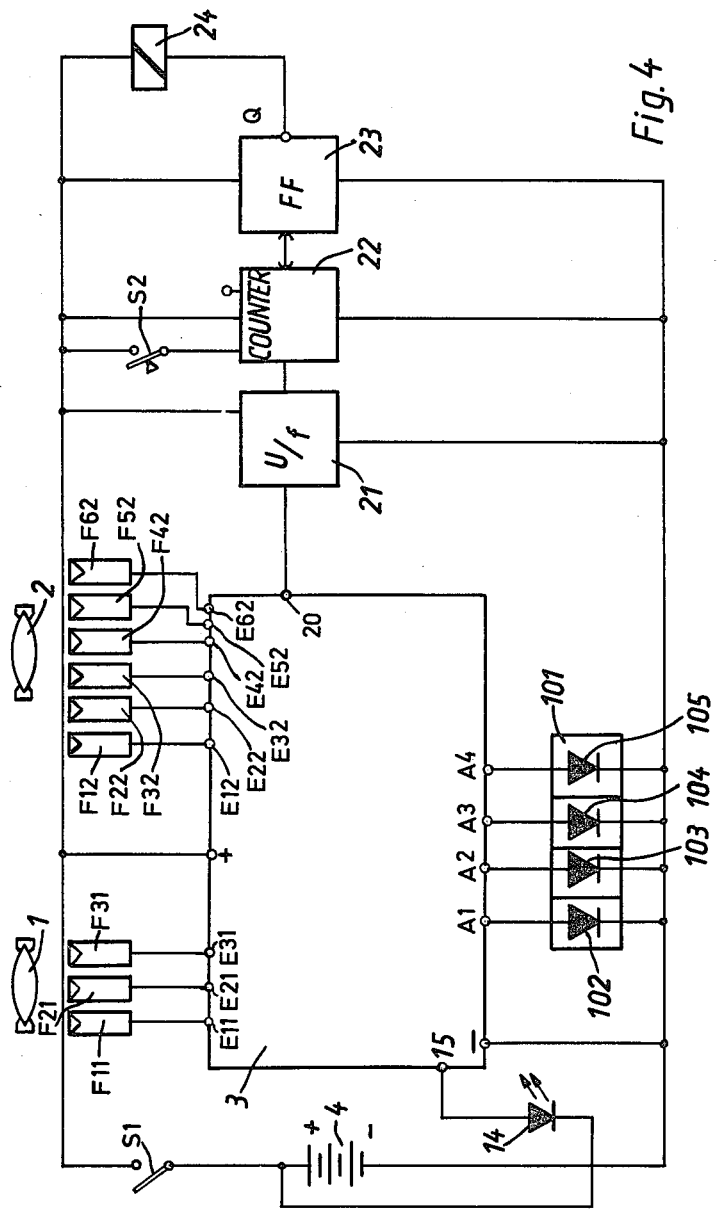
FIG. 4 depicts a third embodiment of the invention.
Figure 5:
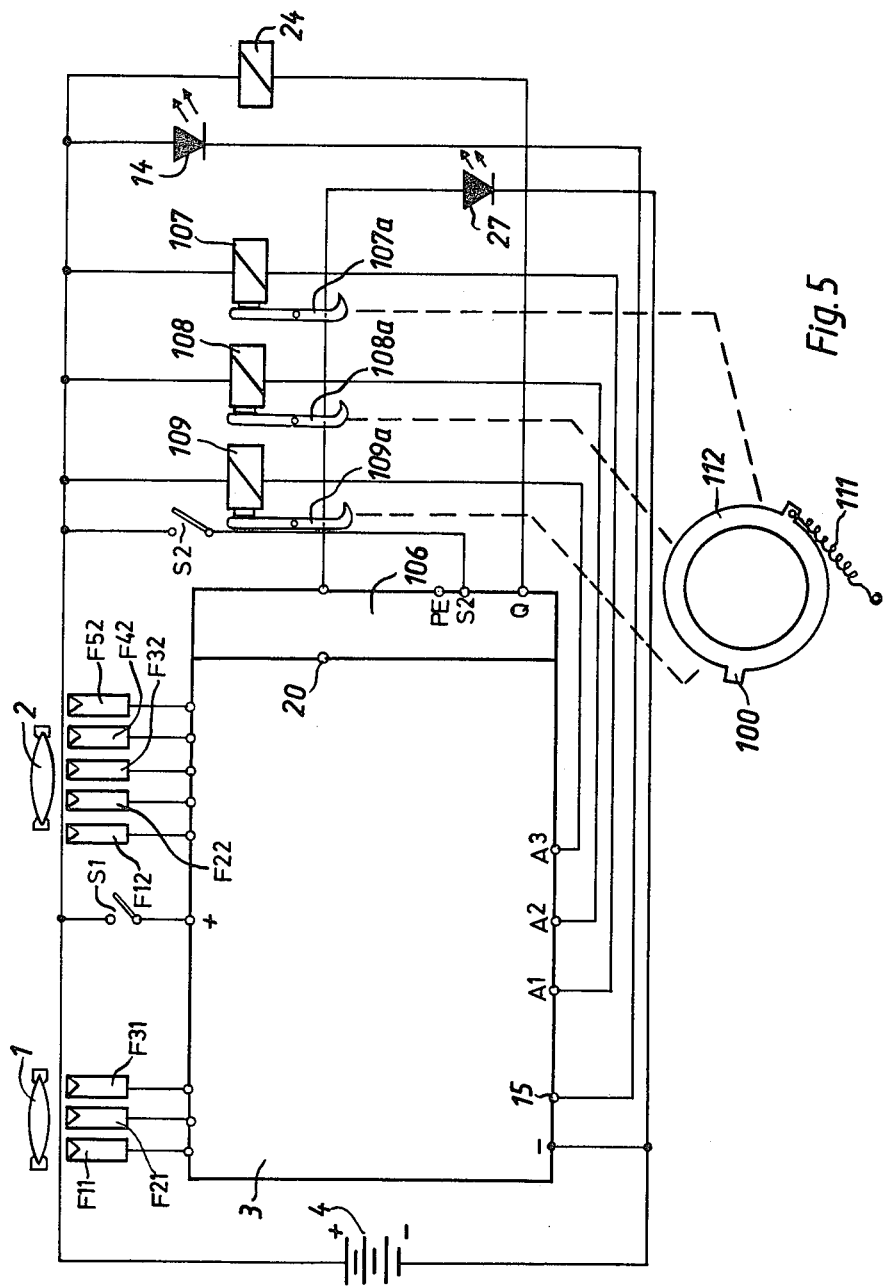
FIG. 5 depicts a fourth embodiment of the invention.

FIG. 3 depicts a second exemplary embodiment of the invention, in which components corresponding to those of the first embodiment are denoted by the same reference numerals as with the first embodiment. Output 12 of comparator 5 is connected to the right input of a NAND-gate 92, whose left input is connected to output 15 of evaluating circuit 3. Output 13 of comparator 5 is connected to the right input of an AND-gate 93, whose left input is likewise connected to output 15 of evaluating circuit 13. The output of AND-gate 93 is connected to the base of a transistor 94, in whose collector circuit is connected a resistor 95. Transistor 94 is here of the npn-type. The output of NAND-gate 92 is connected to the base of a pnp transistor 96, in whose collector circuit is connected a resistor 97. The emitters of the two transistors 94, 96 are connected together. Additionally, the emitters of the two transistors 94, 96 are connected to an electric motor, i.e. to one terminal thereof, the other motor terminal being connected to the tap of a voltage divider comprised of two resistors 99, 100. If a "1" signal appears at output 12 or at output 13 of comparator 5, and if sufficient image contrast is present so that a "1" signal appears at output 15 of evaluating circuit 3, then a "1" signal appears at the output of either NAND-gate 92 or AND-gate 93, and accordingly electric motor 92 is switched on for forwards or reverse operation. FIG. 4 denotes a third embodiment, in which once more components corresponding to those of the first embodiment are denoted by the same reference numerals as with the first embodiment. This embodiment differs from the first, in that the individual ones of the available distancer-setting ranges are individually indicated by light-emitting diodes 102, 103, 104, 105 located visible in the camera viewfinder. The user of the camera need only note which of these four light emitting diodes has lit up and then manually set the focus adjuster ring of the camera to the corresponding distance range. Preferably, transparent numerals or symbols, or the llike, are located in front of these four light emitting diodes, bearing information directly indicative of the four different available subject-distance settings from which the user is to select. FIG. 5 depicts a further embodiment, in which components corresponding to those of the first embodiment are again denoted by the same reference numerals. In contrast to the embodiments described so far, this embodiment contains a second photodetector arrangement which includes only five photodetectors F12, F22, F32, F42, F52, so that here only three subject-distance ranges are available, and the evaluating circuit 3 therefore need only have three output terminals A1, A2, A3. I.e., the photodetector F62, the operational amplifier 33, the resistor 39, the operational amplifier 51, and the input line 71 of the analog multiplexer 53 are here omitted. Likewise, the delay stage 92 would be connected to the output Q3 of the Johnson counter 54.

If more than three or four subject-distance ranges are to be available, then the system is merely expanded by the addition of further photodetectors for the second photodetector arrangement, with the addition of further associated operational amplifiers and further outputs for the Johnson counter 54 and further inputs for the analog multiplexer 53. The gain of the average-generating amplifier stage 40, however, must then be correspondingly selected. In FIG. 5, to avoid unnecessary graphical repetition, the stages 21, 22, 23 and 25 of FIG. 1 are shown consolidated within a single, schematic box 106.

Figure 6:
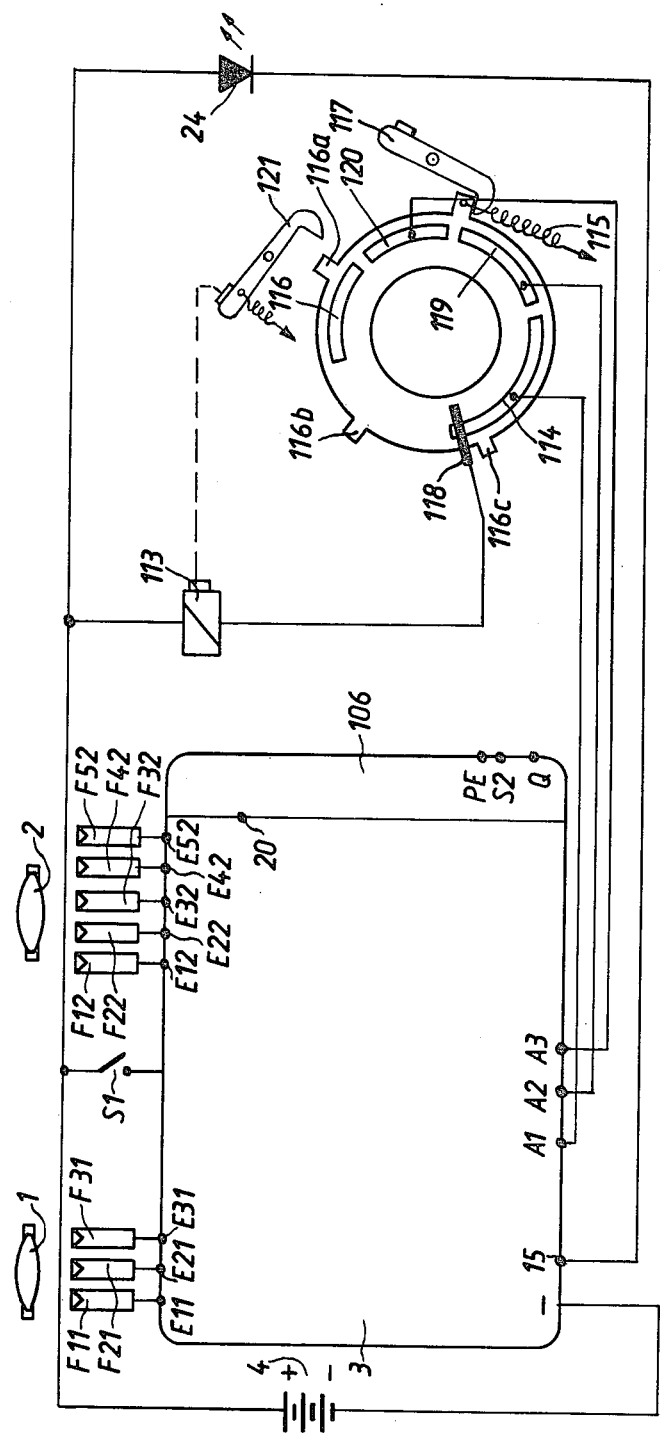
FIG. 6 depicts a fifth embodiment of the invention.

Output A1 of evaluating circuit 3 controls the energization of a focus-control magnet 107; output A2 a focus-control magnet 108; and output A3 a focus-control magnet 109. The armatures of these focus-control magnets 107, 108, 109 are located, one after the other, in the path of motion of a projection 100 provided on a focus adjuster ring 112 coupled to the objective of the camera. Focus adjuster ring 112 is driven by a spring drive mechanism, here shown schematically as a simple tension spring 111. The armatures of the focus-control magnets are denoted by 109a, 108a and 107a. All three of these armatures 107a to 109a are biased by a (non-illustrated) biasing spring arrangement, which attempts to keep these armatures away from the cores of the magnets 107 to 109. When the user initiates an exposure by depressing the shutter-release button of the camera, a non-illustrated latching mechanism releases focus adjuster ring 112, and springdrive mechanism 111 swiftly rotates focus adjuster ring 112 in a direction from minimum subject-distance setting to maximum subject-distance setting, or vice versa. Previous to this, however, a "1" signal will have appeared at a single one of the three outputs A1, A2, A3 of evaluating circuit 3, i.e. in the manner already explained. The one of the three focus-control electromagnets 107, 108, 109 associated with such evaluating-circuit output becomes, as a result, unenergized, so that its armature 107a, 108a or 109a be located in the path of movement of the projection 100 on focus adjuster ring 112; in contrast the "0" signals produced at the other two of outputs A1, A2, A3 of evaluating circuit 3 serve to energize their respective focus-control electromagnets, as a result of which their armatures will be located out of the path of movement of projection 100. Accordingly, projection 100, and therefore the focus adjuster ring 112 as a whole, will be arrested in an angular position corresponding to the system-selected range of subject distance. FIG. 6 depicts an embodiment somewhat similar to that of FIG. 5, and components corresponding to those of FIGS. 5 and 1 are again denoted by the same reference numerals. In contrast to the embodiment of FIG. 5, that of FIG. 6 comprises only a single focus-control magnet 113. Output A1 of evaluating circuit 3 is connected to an arcuate contact strip 114 provided on a focus adjuster ring 116 driven by a springdrive mechanism 115. Numeral 117 denotes a trigger lever which normally prevents focus adjuster ring 116 from being driven by drive mechanism 115. Focus adjuster ring 116 is here shown in its starting position, corresponding to the lowest range of available subject-distance settings. In this position of focus adjuster ring 116, output A1 of evaluating circuit 3 is connected, via the contact segment 114 and a sliding wiper 118, to one terminal of the focus-control electromagnet 113, whose other terminal is connected to the positive battery terminal. With focus adjuster ring 116 in its illustrated starting position, electromagnet 113 will be energized if a "0" signal is present at the output A1 of evaluating circuit 3.

Output A2 of evaluating circuit 3 is connected to an arcuate contact segment 119, which neighbors contact segment 114 and furthermore corresponds to the next-higher available subject-distance range. Output A3 of evaluating circuit 3 is electrically connected to the third arcuate contact segment 123, associated with the third available subject-distance range. The next-following angular sector of focus adjuster ring 116, at which another such contact segment (expressly shown) might be provided, is associated with the longest available subject-distance range. Accordingly, three three-detector photodetector groups in the second photodetector arrangement, the three outputs A1 to A3 of evaluating circuit 3, and the three contact segments 114, 119, 120 on the focus adjuster ring 116, serve to establish four available subject-distance ranges. When the user depresses trigger lever 117, focus adjuster ring 116 swiftly turns clockwise. Depending upon which of the three outputs A1, A2, A3 of evaluating circuit 3 is carrying the "1" signal, focus-control electromagnet 113 falls deenergized at such a time as to cause a latch member 121 to arrest focus adjuster ring 116 by engagement of one of the successive projections 116a, 116b, 116c. If none of these three projections 116a, 116b, 116c is thusly engaged, then focus adjuster ring 116 merely continues to turn to its end position, corresponding to infinite subject-distance settings, and the object is set to maximum subject-distance.

Figure 7:
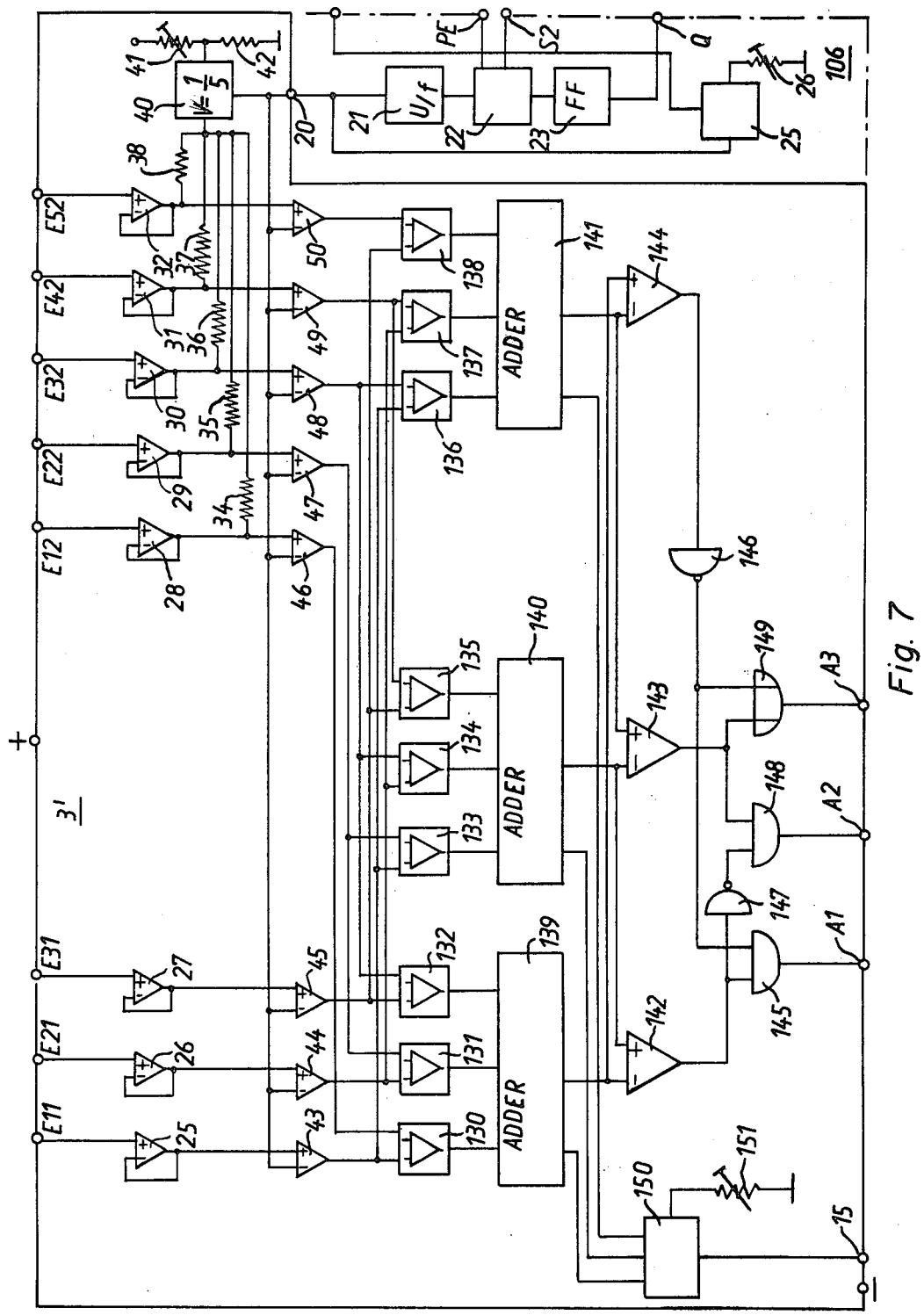
FIG. 7 depicts a sixth embodiment of the invention.

FIG. 7 depicts a further embodiment of the evaluating circuit 3 of FIG. 2, here denoted 3'. For the sake of simplicity components corresponding to those of FIG. 2 are denoted by the same reference numerals. The output of operational amplifier 43 is connected to the left input of a differential amplifier 130, to whose right input is connected the output of operational amplifier 46. Differential amplifier 130 forms at its output a signal corresponding to the absolute-value version of two quantities, one quantity being the output signal from photodetector F11 minus the average of all the output signals of the five photodetectors F12 to F52 of the second photodetector arrangement, the second quantity being the output signal of the first photodetector F12 of the second photodetector arrangement F12 to F52 minus once more the average of all the output signals of the second photodetector arrangement. A further differential amplifier 131 performs a similar absolute-value subtraction, but of the output signals of operational amplifier 47 associated with the second photodetector F22 of the second photodetector arrangement and of the output signal of the operational amplifier 44 of the second photodetector F21 of the first photodetector arrangement. The next differential amplifier 132 forms such an absolute-value subtraction between the signal at the output of operational amplifier 48 associated with the third photodetector F32 of the second photodetector arrangement and the output signal of the differential amplifier 45 of the third photodetector F31 of the first photodetector arrangement.

A differential amplifier 133 forms the absolute-value difference between the output signal of the operational amplifier 47 associated with second photodetector F22 and the output signal of the operational amplifier 43 associated with the third photodetector F11. A differential amplifier 134 forms such a subtraction between the output signal of operational amplifier 48 associated with the third photodetector F32 and the output signal of the operational amplifier 44 associated with the second photodetector F21. A differential amplifier 135 forms such a subtraction between the output signal of the operational amplifier 59 associated with the fourth photodetector F42 of the second photodetector arrangement and the output signal of operational amplifier 45 associated with the third photodetector F31 of the first photodetector arrangement.

A differential amplifier 136 performs such a subtraction between the output signal of the operational amplifier 48 associated with the third photodetector F32 of the second photodetector arrangement and the output signal of the first photodetector F11 of the first photodetector arrangement. A differential amplifier 137 performs such a subtraction between the output signal of the operational amplifier 49 associated with the fourth photodetector F42 of the second photodetector arrangement and the output signal of the operational amplifier 44 associated with the second photodetector F21 of the first photodetector arrangement. A differential amplifier 138 performs such a subtraction between the output signal of the operational amplifier 50 associated with the fifth photodetector F52 of the second photodetector arrangement and the output signal of the operational amplifier 45 associated with the third photodetector F31 of the first photodetector arrangement.

To repeat, the differential amplifiers 130 to 138 produce output difference signals which are absolute-value versions of the differences generated.

A first adder 139 sums the absolute-value difference signals furnished from the differential amplifiers 130, 131, 132. The signal at the output of adder 139 represents the result of the comparison of the signals produced by the photodetectors F11, F21, F31 of the first photodetector arrangement (minus the average of the signals produced by the five photodetectors of the second photodetector arrangement), on the one hand, and, on the other hand, the output signals of the first three photodetectors F12, F22, F32, i.e., the first-group photodetectors, of the second photodetector arrangement (minus the average of the output signals produced by the five photodetectors of the second photodetector arrangement).

The next adder 140 algebraically sums the absolute-value difference signals furnished by the differential amplifiers 133, 134, 135. The output signal produced by adder 140 constitutes the result of the comparison between the output signals of the three photodetectors F11, F21, F31 of the first photodetector arrangement and the output signals of the second three photodetectors F22, F32, F42, i.e., the second-group photodetectors of the second photodetector arrangement, once more referenced to the average of the output signals produced by all photodetectors of the second photodetector arrangement.

The third adder 141 algebraically sums the absolute-value difference signals furnished by the three differential amplifiers 136, 137, 138. The output signal produced by adder 144 represents the result of the comparison between the output signals of the three photodetectors F11, F21, F31 of the first photodetector arrangement and the output signals of the third-group photodetectors F32, F42, F52 of the second photodetector arrangement.

The output of adder 139 is connected to the inverting input of an operational amplifier 142. The output of adder 140 is connected to the inverting input of an operational amplifier 143. The output of the adder 141 is connected to the inverting input of an operational amplifier 144. The non-inverting input of the operational amplifier 142 is connected to the output of adder 140, the non-inverting input of operational amplifier 143 to the output of adder 141, and the non-inverting input of the operational amplifier 144 to the output of adder 139.

The output of operational amplifier 142 is connected to the left input of an AND-gate 145, whose output is connected to the external terminal A1 of the evaluating circuit 3'. The right input of AND-gate 145 is connected, via an inverter 146, to the output of the operational amplifier 144.

The output of the operational amplifier 142 is furthermore connected, via an inverter 147 to the left input of a further AND-gate 148, whose output is connected to the external terminal A2 of the evaluating circuit 3'. The right input of AND-gate 148 is connected to the output of operational amplifier 143. The output of operational amplifier 143 is furthermore connected to the left input of an OR-gate 149, whose right input is connected via an inverter 146 to the output of the operational amplifier 144. The output of the OR-gate 149 is connected to the external terminal A3 of the evaluating circuit 3'.

A "1" signal appears at external terminal A1 when two conditions are concurrently met. One condition is that the value of the output signal of adder 139 be smaller than that of the output signal of adder 140, and the other condition is that the value of the output signal of adder 139 be smaller than that of the output signal of adder 141.

A "1" signal appears at external terminal A2 when two conditions are concurrently met. One condition is that the potential at the output of adder 140 be smaller than that at the output of adder 139, and the other condition is that the potential at the output of adder 140 be smaller than that of the potential at the output of adder 141.

A "1" signal appears at external terminal A3, when two conditions are concurrently met. One condition is that the potential at the output of adder 141 be smaller than the potential at the output of adder 139, and the other condition is that the potential at the output of adder 141 be smaller than the potential at the output of adder 140.

In other resepct the operation of the evaluating circuit 3' shown in FIG. 7 is the same as that of the evaluating circuit 3 shown in FIG. 2. Essentially, the circuit 3' of FIG. 7 performs the plural substrations required simultaneously whereas that of FIG. 2 performs them sequentially.

For the purposes of contrast-sufficiency indication, the outputs of the adders 139, 140, 141 are connected to the inputs of a comparator 150, whose reference level is set by means of an adjustable resistor 151. The comparator 150 serves, first, to algebraically sum the output signals from the adders 139, 140, 141 and, second, to ascertain whether this sum is greater or smaller than the reference level. If the summed value is smaller than the reference voltage, a "1" signal is produced at external terminal 15. This indicates that the contrast is insufficient. If the contrast is sufficient, a "0" signal is produced at external terminal 15.

It will be noted that in the evaluating circuit 3' of FIG. 7 the gain of the average-generating amplifier stage 40 is set to 1/5, corresponding to the fact that the second photodetector arrangement here comprises only five individual photodetectors F12, F22, F32, F42, F52. This is effected by adjustment of the adjustable resistor 41 of the voltage divider 41, 42.

It will be understood that each of the elements described above, or two or more together, may also find a useful application in other types of circuits and constructions differing from the types described above.

While the invention has been illustrated and described as embodied in a focussing system whose first and second photodetector arrangements comprise individual photodetectors interconnected in particular ways for subtraction of their output signals on a particular groupwise basis, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A focussing system for a photographic camera having a camera objective which is adjustable to a number of different subject-distance settings, comprising:
   a first photodetector array fixed to the camera and including a first plurality of adjoining photodetectors;
   a second photodetector array fixed to the camera and including a second plurality of photodetectors, the second plurality exceeding the first plurality by a number dependent upon the number of different subject-distance settings of the objective;
   first optical means fixed to the camera and operative for projecting an image of a subject onto the first photodetector array in such a manner as to prevent any substantial shift between such projected image and the photodetectors in the first photodetector array when objective distance to such subject corresponds to one of the subject-distance settings to which the objective may be adjusted;
   second optical means fixed to the camera and operative for projecting another image of said subject onto the second photodetector array in such a manner as to induce a shift between the projected image and the photodetectors of the second photodetector array with such shift being dependent upon that one of the subject-distance settings which corresponds to objective distance to said subject;
   a signal-evaluating circuit connected to all photodetectors in the first and second photodecetor arrays in such a manner as to divide the photodetectors in the second photodetector array into a successive plurality of groups, each such group including a like number of adjoining photodetectors and overlapping an adjoining group by a like number of photodetectors, whereby each such group corresponds to a respective one of the subject-distance settings of the objective,
   the signal-evaluating circuit including an averager, a subtractor, a comparator and a comparison evaluator, the averager generating an average signal representing an average of all output signals produced by all photodetectors in the second photodetector array, the subtractor subtracting the average signal from each output signal from each photodetector to produce corresponding intermediate signals associated with the photodetectors, the comparator comprising an intermediate signal associated with each individual photodetector in the first photodetector array with an intermediate signal associated with an individual photodetector within each group of photodetectors in the second photodetector array and producing a plurality of difference signals each characteristic of a corresponding comparison, and the comparison evaluator evaluating all such difference signals and selecting that difference signal in which the intermediate signals best approximate each other, whereby a best corresponding group and a corresponding best subject-distance setting of the objective are identified.

2. The system defined in claim 1, wherein output signals from photodetectors in the second array are time-multiplexed in a multiplexer, wherein difference signals are generated one after another in a sequential fashion, wherein the system includes an output register, and wherein the comparator is updatable and operates in a manner that the comparator sequentially compares a stored difference signal with a subsequently generated difference signal and updates any difference signal so stored by replacing it with such subsequently generated difference signal when and only when such signal is smaller than any signal previously so stored, whereby a last difference signal so stored is a smallest difference signal, and wherein the output register registers a group signal representing that group of photodetectors with which each difference signal so stored is associated, whereby a last group signal so registered represents that group of photodetectors with which the smallest difference signal is associated, thus identifying a best subject-distance setting of the objective.

3. The system defined in claim 2, further including a startup circuit causing the first difference signal generated to be stored in the comparator.

4. The system defined in claim 3, further including a final register and an end of comparison means, the end of comparison means producing an end of comparison signal after all difference signals have been generated and have been compared in the comparator, the final register cooperating with the output register and the end of comparison means and operating to cause any contents of the output register to be reflected in the final register upon the generation of an end of comparison signal.

* * * * *